United States Patent Office 3,062,786

Patented Nov. 6, 1962

3,062,786

PROCESS FOR PREPARING LINEAR POLYESTERS USING TRIARYL ARSINE CATALYST

Brian W. Pengilly, Stow, Ohio, assignor to The Goodyear Tire & Rubber Company, Akron, Ohio, a corporation of Ohio No Drawing. Filed Aug. 14, 1961, Ser. No. 131,080

7 Claims. (Cl. 260—75)

This invention relates to the preparation of linear polyesters. More particularly this invention relates to an improved catalyst for condensation polymerization reactions which produce high polymeric linear polyesters.

In the preparation of linear superpolyesters, one of the most satisfactory methods from the standpoint of simplicity of reaction and economy of operation has been the ester interchange method in which the esters of the acids are reacted with a glycol to form the diglycol esters of the acid or a low molecular weight polymeric polyester which is then polymerized to a high molecular weight polymeric polyester by a condensation reaction with the splitting out of glycol. This process, however, has not been entirely satisfactory because the initial ester interchange reaction is slow and because many of the materials that catalyze this reaction are not effective as catalysts for the subsequent condensation reaction.

Heretofore, various materials have been proposed as catalysts for the ester interchange reaction between the esters of dicarboxylic acids and glycols and for the subsequent polymerization or condensation reaction. Metals in the form of powder, chips, ribbon or wire have been suggested, as have surface catalysts such as broken glass or silica gel. Among the more successful of the catalysts used in the past have been the alkaline materials such as the alkali metal and alkaline earth metal alcoholates, the alkali metal carbonates, or other alkaline reacting salts, alkaline earth oxides, and litharge.

Many of these materials are effective catalysts for the initial simple ester interchange, and some of them catalyze the condensation reaction. However, many of the substances that catalyze the condensation reaction carry the polymerization only to a low degree or they do not promote the reaction effectively enough to give reaction rates acceptable for a commercial process.

It is an object of the present invention to prepare high molecular weight linear polyesters. Another object is to accelerate by catalysts the condensation or polymerization reaction by which such polyesters are prepared from bis glycol esters of dicarboxylic acids or from low polymers of such glycol esters. Still another object is to provide a catalyst for promoting the condensation or polymerizaiton of bis glycol esters of dicarboxylic acids or low polymers of such glycol esters to form high molecular weight polyesters. Other objects will appear hereinafter as the description of the reaction proceeds.

According to the present invention triaryl arsine compounds of the general formula $Ar_3As$ in which Ar is an aryl radical and As is the chemical symbol for arsenic catalyze the condensation polymerization of the bis glycol esters or low polymers thereof and permit the formation in relatively short reaction times of linear polyesters of high molecular weight which may be readily processed to form products having excellent properties, including good color, i.e., freedom from discoloration.

For example, terephthalate or isophthalate esters or a mixture thereof can be reacted with a glycol and the resultant glycol ester condensed to form a polymer in the presence of a triaryl arsine compound. The bis glycol ester may be prepared by any suitable method such as by reacting the sodium or potassium salt of the acid with ethylene chlorohydrin or by reacting the acid with a large excess of the glycol or alkylene oxide. The bis ester or low molecular weight polymer thereof can then be polymerized according to the usual known techniques using a triaryl arsine as the catalyst.

The following examples illustrate the practice of the invention:

*Example 1*

A glass reaction tube, approximately 35 centimeters long having an inside diameter of 38 millimeters, and equipped with a side arm, a nitrogen gas inlet tube, and a stirrer was charged with 50 grams of a 60/40 bis betahydroxyethyl terephthalate-bis betahydroxyethyl isophthalate mixture which contained 0.015 gram of zinc acetate and 0.0025 gram of manganous acetate. 0.013 gram of triphenyl arsine was added. The mixture was heated at 244° C. at atmospheric pressure by a hot vapor bath around the tube. The mixture was stirred while nitrogen gas was slowly passed through it. After twenty minutes under these conditions the pressure in the reaction tube was slowly reduced to 0.7 millimeter of mercury pressure. Then after 15 minutes the vapor bath was replaced by another one having a temperature of 285° C. After 1½ hours of condensation at 285° C. and 0.7 millimeter of mercury pressure the polyester formed had an intrinsic viscosity of 0.664 when measured in a 60/40 phenoltetrachloroethane mixture at 30.0° C. The polyester was very light in color.

As a control for the above example bis hydroxyethyl terephthalate containing the ester interchange catalyst but no condensation catalyst was heated under condensation conditions according to the following example.

*Example 2*

Fifty grams of bis hydroxyethyl terephthalate containing 0.015 gram of zinc acetate and 0.0025 gram of manganous acetate were placed in a glass reaction tube of the same type used in Example 1. The mixture was stirred and heated at 244° C. and the pressure was reduced to 1 millimeter of mercury pressure over a period of thirty minutes. The temperature was then raised to 275° C. and the mixture was heated at this temperature and 1 millimeter of mercury pressure for two hours. The polymer obtained had an intrinsic viscosity measured in a 60/40 phenol-tetrachloroethane mixed solvent at 30.0° C. of 0.44.

A comparison of these two experiments shows that the triaryl arsine compound accelerates the condensation reaction and enables a higher degree of condensation to be obtained in a shorter reaction time.

The invention has been illustrated particularly with respect to the use of triphenyl arsine as a catalyst. Other triaryl compounds of the general formula $Ar_3As$ in which Ar is an aryl radical and As is the chemical symbol for arsenic may be used. The aryl radicals can be the same or different aryl radicals such as phenyl, tolyl, ethyl phenyl, methoxy phenyl, ethoxy phenyl and naphthyl. They can be substituted in various positions on the aryl ring. Representative examples of the compounds are triphenyl arsine, tri o-tolyl arsine, tri m-tolyl arsine, tri p-tolyl arsine, phenyl di o-tolyl arsine, phenyl di p-tolyl arsine, diphenyl o-tolyl arsine, diphenyl p-tolyl arsine, tri(p-ethyl phenyl)arsine, tri $\alpha$-naphthyl arsine, and diphenyl $\alpha$-naphthyl arsine.

The practice of the invention has been illustrated with particular respect to the preparation of a 60/40 ethylene terephthalate-ethylene isophthalate copolyester. Polymeric ethylene terephthalate, polymeric ethylene isophthalate and copolymers containing various ratios of ethylene terephthalate to ethylene isophthalate can similarly be made using a triaryl arsine as catalyst. Also, high molecular weight linear polyesters of other dicarboxylic acids can be made starting with the proper bis esters or low molecular weight polymers thereof. Representative examples of such acids are sebacic acid, adipic acid, azelaic acid, phthalic acid and the naphthalic acids. Esters of other glycols can be used such as esters of the polymethylene glycols such as trimethylene glycol, tetramethylene glycol, pentamethylene glycol, and hexamethylene glycol, diethylene glycol and 2,2-bis 4-(betahydroxyethoxy)phenyl propane. If desired, copolyesters can be formed by using mixtures of glycol esters of the acids.

The invention is illustrated particularly with respect to the polymerization of bis glycol esters. The tri aryl arsine compounds can also be used to catalyze the condensation of low polymeric glycol esters of dicarboxylic acids including low molecular weight polymers of the bis glycol esters.

The amount of the catalyst used may be varied over wide concentrations. As is usual with catalysts, the amount will be relatively small. As a general rule, the amount will be within the range of from .0046 to .155 mol percent based on the acid units present. The preferred range is from .0077 to 0.123 mol percent based on the acid units to give a satisfactory reaction rate and a product of suitable viscosity and color.

Triphenyl arsine can be used as the sole catalyst for the condensation reaction, or if desired, small amounts of another catalyst can also be used to assist in obtaining a polyester of higher viscosity in shorter reaction times. Thus, small amounts of a catalyst such as manganous acetate or zinc acetate can be used in conjunction with the catalyst of this invention.

In the practice of the invention, the preparation of the glycol ester and its subsequent polymerization is, in general, carried out in accordance with the usual, known techniques. Thus, the reaction is preferably carried out in the absence of oxygen, generally in an atmosphere of an inert gas such as nitrogen or the like, in order to lesesn darkening and to make it possible to obtain a high molecular weight pale or colorless product. Bubbling the inert gas through the reacting mixture serves the added functions of agitation and of expediting the removal of volatile components formed by the reaction. The polymerization or condensation reaction is carried out under reduced pressure, generally below 10 millimeters of mercury pressure and usually at or below 1 millimeter of mercury pressure at a temperature in the range of from 260 to 290° C., although other pressures and temperatures can be used, according to known practice.

While certain representative embodiments and details have been shown for the purpose of illustrating the invention, it will be apparent to those skilled in this art that various changes and modifications may be made therein without departing from the spirit or scope of the invention.

I claim:

1. In a process for preparing a high molecular weight linear polyester by condensing a glycol ester of a dicarboxylic acid with the removal of glycol, the improvement which comprises condensing the glycol ester in the presence of a catalytic amount of a triaryl arsine compound of the general formula $Ar_3As$ in which Ar is an aryl radical and As is the symbol for arsenic.

2. A process according to claim 1 in which the triaryl arsine is triphenyl arsine.

3. The process of claim 2 in which the amount of triphenyl arsine is from 0.0046 to .155 mol percent based on the acid units present.

4. A process according to claim 1 in which the triaryl arsine is tritolyl arsine.

5. A process according to claim 1 in which the glycol ester of the dicarboxylic acid is selected from the group consisting of bis glycol esters of terephthalic acid and bis glycol esters of isophthalic acid.

6. In a process for preparing a linear polyester by subjecting at least one bis ester of an acid selected from the group consisting of terephthalic acid and isophthalic acid to alcoholysis in the presence of an excess of ethylene glycol and thereafter subjecting the bis ethylene glycol ester thus formed to self-condensation with the removal of ethylene glycol, the improvement which comprises conducting the condensation in the presence of a catalytic amount of triphenyl arsine.

7. In a process for preparing a linear copolyester by the self-condensation with the removal of ethylene glycol of a mixture of ethylene glycol terephthalate and ethylene glycol isophthalate, the improvement which comprises conducting the condensation in the presence of a catalytic amount of triphenyl arsine.

References Cited in the file of this patent

UNITED STATES PATENTS 2,437,232 Rothrock et al. ---------- Mar. 2, 1948